Patented July 11, 1933

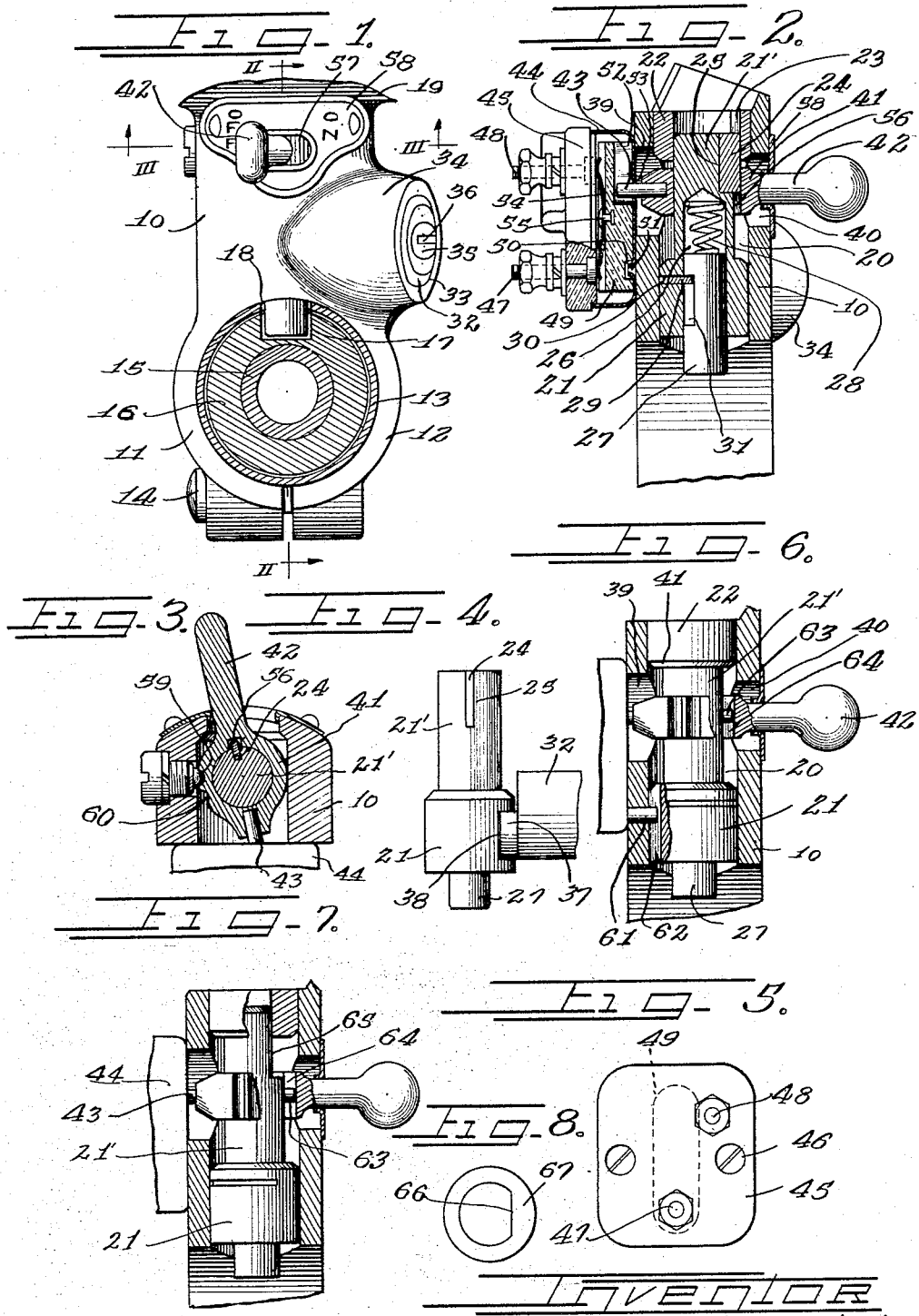
July 11, 1933.  E. J. VAN SICKEL  1,917,620
LOCK STRUCTURE
Filed March 14, 1932
Inventor
Ernest J. Van Sickel.

1,917,620

UNITED STATES PATENT OFFICE

ERNEST J. VAN SICKEL, OF WAUKEGAN, ILLINOIS, ASSIGNOR TO OAKES PRODUCTS CORPORATION, OF NORTH CHICAGO, ILLINOIS, A CORPORATION OF MICHIGAN

LOCK STRUCTURE

Application filed March 14, 1932. Serial No. 598,547.

My invention relates to lock structures which are particularly adaptable for the sequential locking of control elements on automotive vehicles as for example, the steering control and the ignition control.

My invention concerns particularly that type of lock structure in which a lock bolt element is shiftable in axial direction to locking or unlocking position, and an actuating element is rotatable to control the operation of a switch, with provision for preventing operation of the switch actuating element except when the bolt element is in unlocking position and for preventing return of the bolt element to locking position while the actuating element is holding the switch in open position.

My invention involves a number of features of construction, arrangement and operation all of which combine to produce a compact, durable and efficient lock structure. The various features of the invention are shown incorporated in the structure disclosed on the drawing, in which drawing Figure 1 is a plan view of the lock structure applied to a steering column of an automobile, shown in section;

Figure 2 is a section on plane II—II of Figure 1;

Figure 3 is a section on plane III—III of Figure 1;

Figure 4 is a plan view of the lock bolt element and the lock cylinder structure for controlling the operation thereof;

Figure 5 is a plan view of the switch structure;

Figure 6 is a sectional view similar to Figure 2 showing a modified arrangement;

Figure 7 is a sectional view showing another modified arrangement; and

Figure 8 is the end view of a bushing used in the structure of Figure 7.

The lock structure shown comprises the housing 10 having the semi-cylindrical ends 11 and 12 for receiving a steering column 13, the ends being clamped around the column as by means of a screw or bolt 14. Extending through the column is the steering shaft 15 having a collar 16 secured thereto in which is a locking notch 17 which is adapted to register with the hole 18 through the steering column when the shaft is in a certain position, usually for straight forward travel of the vehicle. At its rear end the housing 10 has an extension 19 which is shown broken away but which actually terminates in a flange by means of which the housing may be secured to a support as for example the dash board of the vehicle. The housing 10 has the cylindrical bore 20 extending therethrough in axial alignment with the hole 18 through the steering column 13 and operable in this bore is a lock bolt element comprising the cylindrical head 21 which fits the bore, and the reduced rear end 21' which is also cylindrical. This reduced end has bearing in a bushing 22 secured in the inner end of the bore and provided with a longitudinally extending slot or key-way 23 for receiving the stop and guide key 24 secured in the slot 25 in the reduced end 21', the lock bolt structure body being thus adapted for movement axially in the bore 20 but not being restrained against rotational movement therein.

The bolt structure body has the axially extending pocket 26 for receiving the lock bolt 27 which is urged outwardly by a spring 28, the movement of the bolt being limited by a key 29 secured in a transverse slot 30 in the head 21 and extending into the notch 31 formed in the bolt 27. When the bolt element is shifted outwardly the bolt 27 enters the hole 18 in the steering column and if the notch 17 is in alignment with the hole 18 the bolt will continue into the notch and will lock the steering shaft to the steering column thus to prevent steering of the vehicle.

The reciprocation of the locking bolt element is controlled by a lock cylinder 32 secured in the cylindrical pocket 33 in the extension 34 on the housing 10, the lock cylinder journalling a lock barrel 35 adapted to be turned by the insertion of a suitable key in the key-hole 36. Secured to the inner end of the lock barrel is a cylindrical cam disc 37 whose center is at one side of the axial line of the lock barrel. The cam disc engages in the slot or recess 38 cut in the head 21 of the bolt structure body and with this arrangement, when the key is turned in the lock, the cam disc is swung through an arc and the lock bolt structure is reciprocated axially. The extent of rotation of the cam disc is 180 degrees and when the cam disc is in front of the axis of the lock barrel the lock bolt structure will be in locking position and will be held in this position, and after rotation of the lock barrel 180 degrees, the cam disc will be carried to the other side of the lock barrel axis and the lock bolt structure will be in unlocking position and will be held in such position by the cam disc.

Openings 39 and 40 extend from opposite sides of the housing 10 through the bore 20 and form a transverse passageway through the housing. In this passageway is located the actuating element for the switch structure. The actuating element comprises a hub 41 receiving the reduced end 21' of the lock bolt structure body in order to be fulcrumed thereon, and extending from the hub outwardly through the opening 40 is the arm or handle 42 by means of which the hub may be rotated. On the side opposite to the arm 42 a pin 43 extends from the hub for cooperation with the switch structure.

The switch structure comprises a cup-shaped casing 44 which may be of sheet metal and of rectangular contour. A cover structure 45 of insulating material is provided for the casing and this cover together with the casing are secured to the housing 10 as by means of screws 46. The cover supports the terminal posts 47 and 48 to which is connected the circuit to be controlled as for example the ignition circuit of a vehicle engine. The inner ends of the posts terminate flush with the inner face of the cover and the terminal post 48 is offset laterally relative to the post 47.

Within the casing is the oblong switch block 49 of insulating material and at one end and in its under side is a pivot hole 50 for receiving a pivot post 51 which may be formed by deflecting a section of the bottom of the casing. In its inner side and at the other end, the switch block has the longitudinally extending slot 52 for receiving the end of the pin 43, the bottom of the casing having the clearance opening 53 for the pin so that as the actuating element 41 is rotated the pin may move therewith and swing the switch block.

On the outer side of the switch block a switch blade 54 is secured at its center as by means of a rivet 55, one end of this switch blade being in alignment with the pivot post 51 and the terminal post 47 so that this end of the blade is always in engagement with this terminal post. During swing of the actuating element 41 the switch block will be swung to carry the other end of the switch blade into contact with or away from the other terminal post 48 to close or to open the circuit.

The arrangement is such that the switch is opened when the lock bolt structure is in locking position and can be closed only when the lock bolt structure is shifted to unlocking position. To accomplish this, the hub of the actuating element 41 is provided with an axially extending slot 56 in which the key 24 on the lock bolt element engages when the bolt element is in locking position, as shown in Figure 2. The actuating element is held against axial movement by the engagement of the pin 43 in the slot 53 in the casing 44 and also by the engagement of the arm 42 in the slot 57 formed in the escutcheon plate 58 secured on the housing 10. Now, when the lock bolt structure is shifted to its unlocking position by operation of the key in the lock, the key 24 will be carried out of the slot 56 in the actuating element 41 and this element will then be free to be rotated to swing the switch block and close the switch. The key 24, however, always engages in the key-way 23 in the bushing 22 to prevent rotational movement of the lock bolt structure and after shift of the lock bolt structure to unlocking position and rotation of the actuating element 41 to close the switch, the solid part of the hub of the actuating element will be in front of the key 24 and it will be impossible to then shift the lock bolt structure back to locking position. This can be accomplished only by rotating the actuating element 41 back to switch opening position and to bring the slot 56 back into alignment with the key. Thus, the steering control of the vehicle cannot be locked while the switch is closed, nor can the switch be operated until the steering has been unlocked, and when the steering is unlocked the actuating element 41 may be freely rotated to open and close the switch for corresponding control of the ignition circuit.

The escutcheon plate 58 has the indications "Off" and "On" therein with which the arm 42 of the switch actuating element cooperates to indicate to the driver the condition of the ignition circuit. The lock cylinder may be of the type which prevents withdrawal of the key except when the lock bolt structure is in locking position.

To give the actuating element 41 a snap action a spring pressed ball 59 may be provided for engaging in stop notches 60 formed in the hub 41, this arrangement assuring full movement of the actuating element 41 for efficient operation of the switch.

In the modified arrangement of Figure 6, the lock bolt structure is restrained against rotational movement by a pin 61 secured in the housing 10 and engaging in the longitudinal slot 62 cut in the head 21 of the lock bolt element. The reduced end 21' of the bolt structure is then provided with a pin 63 engaging in the axially extending slot 64 formed in the hub of the switch actuating element. When the lock bolt structure is in locking position as shown in Figure 6, the pin 63 is within the slot 64 and the actuating element cannot be rotated for switch operation. However, when the lock bolt structure is shifted to unlocking position the pin leaves the slot and the actuating element will then be free for rotational movement to operate the switch.

In the modified arrangement of Figure 7 we have the same pin and slot connection between the lock bolt element and the actuating element but the lock bolt element is restrained against rotational movement by the engagement of the flat side 65 at its inner end with the flat side 66 formed in the bushing 67.

My improved lock structure comprises simple and economically manufactured parts which can be quickly and easily assembled and which form a compact and efficient structure.

I have shown practical and efficient embodiments of the various features of my invention but I do not desire to be limited to the exact construction, arrangement and operation shown and described as changes and modifications may be made without departing from the scope of the invention as defined by the appended claims.

I claim as follows:

1. A lock structure comprising a housing having a longitudinal passageway and a transverse passageway therethrough, said passageways intersecting, a lock bolt element adapted for movement in axial direction in said longitudinally extending passageway, a key on said lock bolt element, said housing having a key-way in which said key engages for preventing rotational movement of said bolt element, a switch on said housing, an actuating element for said switch located in said transverse passageway and fulcrumed on said bolt element, said actuating element having a key-way adapted to receive said key whereby said actuating element is locked against operation when said lock bolt element is in locking position, said key being removed from said actuating element key-way when said lock bolt structure is in unlocking position whereby said actuating element may then be operated to control said switch.

2. In lock structure, the combination of a housing having intersecting longitudinal and transverse passageways, a lock bolt element movable in axial direction in said longitudinal passageway, a switch on said housing, an actuating element for said switch extending through said transverse passageway and fulcrumed on said bolt element for rotational movement to operate the switch, said housing having a key-way at its inner end and said actuating member having a key-way, a key carried by the bolt element and always engaging in said housing key-way whereby to lock said bolt element against rotational movement, said actuating element key-way being in alignment with the housing key-way when said actuating element has moved the switch to a certain position whereby said bolt element may then be shifted to locking position and said actuating element will be locked against rotational movement, said key being of a length to be withdrawn from said actuating element key-way when said bolt element is moved to unlocking position whereby said actuating element may then be rotated to set said switch to another position.

3. A lock structure comprising a housing having a longitudinally extending passageway therethrough, a lock bolt element adapted for movement in axial direction in said passageway, a switch, an actuating element for said switch located in said housing and adapted by its rotational movement to operate said switch, and a common means interconnecting said bolt element with both said housing and said actuating element to lock said elements against rotational movement when said lock bolt element is in locking position but to release said actuating element for rotational movement to operate the switch when said lock bolt element is in unlocking position.

4. A lock structure comprising a housing, a lock bolt element adapted for movement in said housing in axial direction to locking and unlocking position, a switch on said housing, an actuating element in said housing adapted when rotated to operate said switch, and a key interlocking said housing with both said elements to prevent rotation thereof when said lock bolt structure is in locking position and to release said actuating element from said housing for rotational movement to operate said switch when said lock bolt structure is in unlocking position.

5. A lock structure comprising a housing, a lock bolt element adapted for movement in axial direction in said housing to locking or unlocking position, a switch on said housing, an actuating element in said housing fulcrumed on said lock bolt element and adapted when rotated to operate said switch, said housing and said actuating element having key-ways, a key on said lock bolt element engaging in both key-ways to lock both elements against rotational movement when said lock bolt element is in locking position, said key being withdrawn from said actuating element to release said element for switch operation when the lock bolt structure is in unlocking position, and said actuating element while operating said switch being in the path of said key to prevent return movement of said lock bolt element to locking position.

6. A lock structure comprising a housing having a longitudinal passageway therethrough, a lock bolt element movable in axial direction in said passageway, a bushing in the inner end of said passageway for guiding the inner end of said lock bolt element, interconnection between said bolt and bushing preventing rotational movement of said bolt element, a switch, an actuating element for said switch rotatable independently of said bolt element when said bolt element is in unlocking position, and interlocking means between said elements for preventing switch operating movement of said actuating element when said bolt element is in locking position and for preventing movement of said bolt element to locking position when said actuating element operates said switch.

7. A lock structure comprising a housing having a passageway therethrough, a lock bolt element shiftable axially in said passageway, a bushing in said passageway guiding said bolt element for axial movement but adapted to prevent rotational movement thereof, a switch, an actuating member rotatable to operate said switch, and means controlled by the axial movement of said bolt element for alternately locking and unlocking said actuating element.

8. A lock structure comprising a housing having a passageway therethrough, a lock bolt element shiftable axially in said passageway, a bushing in said passageway guiding said bolt element for axial movement but adapted to prevent rotational movement thereof, a switch, an actuating member rotatable to operate said switch, and means controlled by the axial movement of said bolt element for alternately locking and unlocking said actuating element, and means for locking said bolt element against reciprocation when said actuating element is moved to one position.

9. A lock structure comprising a housing, a lock bolt element movable axially in said housing, a switch, a rotatable actuating element for said switch, and a locking member cooperable with said housing and actuating element to at all times lock said bolt element against rotary movement and alternately locking and unlocking said actuating element as said bolt element is moved axially.

In testimony whereof I have hereunto subscribed my name at North Chicago, Lake County, Illinois.

ERNEST J. VAN SICKEL.